United States Patent
Lemchen et al.

(10) Patent No.: US 12,450,848 B2
(45) Date of Patent: Oct. 21, 2025

(54) METHOD FOR AUTOMATIC CREATION OF 3D MODELS FOR DENTAL AND ORTHODONTIC USE

(71) Applicant: CADFLOW, Huntington Beach, CA (US)

(72) Inventors: Marc Lemchen, New York, NY (US); Todd Blankenbecler, Atlanta, GA (US); Alan Yan, New York, NY (US); Ryan Goy, Redondo Beach, CA (US); Vijay Dhaka, Huntington Beach, CA (US)

(73) Assignee: CADFLOW, Huntington Beach, CA (US)

( * ) Notice: Subject to any disclaimer, the term of this patent is extended or adjusted under 35 U.S.C. 154(b) by 431 days.

(21) Appl. No.: 17/916,278

(22) PCT Filed: Apr. 1, 2021

(86) PCT No.: PCT/US2021/025422
§ 371 (c)(1),
(2) Date: Sep. 30, 2022

(87) PCT Pub. No.: WO2021/202903
PCT Pub. Date: Oct. 7, 2021

(65) Prior Publication Data
US 2023/0149130 A1 May 18, 2023

Related U.S. Application Data

(60) Provisional application No. 63/003,568, filed on Apr. 1, 2020.

(51) Int. Cl.
*G06T 19/20* (2011.01)
*A61C 7/02* (2006.01)
*A61C 7/14* (2006.01)

(52) U.S. Cl.
CPC .............. *G06T 19/20* (2013.01); *A61C 7/02* (2013.01); *A61C 7/146* (2013.01); *G06T 2210/41* (2013.01); *G06T 2219/2021* (2013.01)

(58) Field of Classification Search
CPC .......... A61C 7/02; A61C 7/146; G06T 19/20; G06T 2219/2021
See application file for complete search history.

(56) References Cited

U.S. PATENT DOCUMENTS

| | | | | | |
|---|---|---|---|---|---|
| 5,748,199 | A | * | 5/1998 | Palm | H04N 13/246 |
| | | | | | 348/E13.058 |
| 6,476,803 | B1 | * | 11/2002 | Zhang | G06T 17/005 |
| | | | | | 345/582 |

(Continued)

FOREIGN PATENT DOCUMENTS

WO 2018170426 9/2018

OTHER PUBLICATIONS

Extended European Search Report dated Jun. 18, 2024, EP Application No. 21782069, 10 pages.

*Primary Examiner* — Nicholas D Lucchesi
(74) *Attorney, Agent, or Firm* — MH2 Technology Law Group, LLP

(57) ABSTRACT

A system and method that is a web based application for creating and managing 3D models used in orthodontic laboratory prescriptions within a dental clinic or lab. The method includes automatically detecting and removing any appliances contained within the 3D image file. After the appliances have been removed, the system then automatically replaces the removed image data with new image data that is calculated to approximate the surface of the tooth disposed beneath the deleted appliance in order to create a clean, second 3D image. The method may further automatically refine the second 3D image of the patients teeth or delete any artifacts which remain after creation of the second (Continued)

3D image. The second 3D image may then be used as the basis on which to change the patients orthodontic or dental prescription.

14 Claims, 3 Drawing Sheets

(56) References Cited

U.S. PATENT DOCUMENTS

| | | | | |
|---|---|---|---|---|
| 9,503,282 B2* | 11/2016 | Kody | | H04N 1/0022 |
| 9,737,257 B2* | 8/2017 | Ribnick | | A61B 5/0062 |
| 10,413,385 B2* | 9/2019 | Sherwood | | G16H 30/40 |
| 10,548,691 B2* | 2/2020 | Lemchen | | A61C 7/002 |
| 11,103,330 B2* | 8/2021 | Webber | | B33Y 80/00 |
| 2003/0021453 A1 | 1/2003 | Weise | | |
| 2009/0310846 A1* | 12/2009 | Lemchen | | G06T 19/003 |
| | | | | 382/132 |
| 2011/0004331 A1 | 1/2011 | Cinader, Jr. | | |
| 2013/0325431 A1* | 12/2013 | See | | A61C 7/002 |
| | | | | 703/11 |
| 2014/0067334 A1* | 3/2014 | Kuo | | A61C 7/002 |
| | | | | 703/1 |
| 2014/0195892 A1* | 7/2014 | Hampton | | G06F 40/166 |
| | | | | 715/234 |
| 2015/0097827 A1* | 4/2015 | Cohen | | G06T 5/77 |
| | | | | 345/420 |
| 2015/0235399 A1* | 8/2015 | Shechtman | | G06T 5/77 |
| | | | | 345/639 |
| 2016/0027151 A1* | 1/2016 | Edwin | | G06T 5/77 |
| | | | | 382/195 |
| 2018/0206939 A1* | 7/2018 | Kim | | B33Y 80/00 |
| 2019/0147666 A1* | 5/2019 | Keustermans | | G06T 19/20 |
| | | | | 433/213 |
| 2019/0231490 A1 | 8/2019 | Sabina et al. | | |
| 2019/0287224 A1* | 9/2019 | Amirghodsi | | G06T 5/20 |
| 2020/0015936 A1* | 1/2020 | Ye | | A61C 7/12 |
| 2023/0048898 A1* | 2/2023 | Cofar | | G16H 30/20 |
| 2023/0051506 A1* | 2/2023 | Cofar | | A61C 7/002 |
| 2023/0068727 A1* | 3/2023 | Saphier | | G06T 17/20 |

* cited by examiner

METHOD FOR AUTOMATIC CREATION OF 3D MODELS FOR DENTAL AND ORTHODONTIC USE

BACKGROUND

Field of the Technology

The invention relates to the field of manufacturing customized orthodontic and dental appliances, and in particular to the automatic editing of 3D images used in creating an orthodontic or dental prescription for a patient.

Description of the Prior Art

In the orthodontic office and laboratory, prescriptions which were once prepared manually with resin impressions or molds are more and more being carried out in a digital workspace. Instead of creating a physical mold of the patient's teeth which can be uncomfortable for the patient or time consuming, the patient simply scans their mouth and teeth via an intraoral digital scan.

Once the patient has had their teeth digitally scanned, the orthodontist may take data from the scan to create a 3D image which corresponds to the patient's teeth. Since each prescription is unique to each patient and may be made up of multiple parts or appliances with very specific designs, the 3D image is manipulated accordingly to add or remove any appliances which may be necessary to carry out the orthodontist's new or updated prescription. Once complete, specifications corresponding to the appliances added to the 3D image and the 3D image itself are sent out to a lab for manufacture. Use of a 3D model allows the orthodontist to virtually apply or reapply different appliances to the patient's teeth without having to use a physical casting of the patient's teeth, thus dramatically cutting down on the time and expense required for preparing a patient's orthodontic prescription.

A problem develops however for those patients who are already wearing orthodontic appliances including brackets for braces who then undergo an intraoral scan to have their prescription altered or changed. The resulting 3D image of the patient's teeth therefore inherently includes these preexisting appliances, making it difficult if not impossible for the orthodontist to apply new orthodontic appliances or adjust preexisting ones within the 3D image.

Additionally, while 3D image editing tools exist which could potentially remove the brackets from the initial 3D image, these tools are quite labor intensive and can require multiple hours to edit for even a single patient. Specifically, many 3D image tools require a user to manually select the image object to be removed, remove the object, and then complete any additional image editing. Furthermore many of these same 3D image editing tools lack the capability to reconstruct the surface of the teeth after the removal of the brackets, thereby resulting in a "hole" or blank spot where no image data exists.

What is needed is a method modifying 3D images, such as removing orthodontic appliances including brackets from 3D images, to assist in the design and or manufacture of dental prosthetics. The method should be simple and easy to use as well as fast to implement by being largely automatic and requiring little to no input from a user.

BRIEF SUMMARY

The illustrated embodiments of the invention include within their scope a method of creating and manipulating a 3D model which may be subsequently used when creating an orthodontic or dental prescription. The method includes obtaining a 3D image corresponding to a patient's teeth, automatically removing brackets from the 3D image and/or restoring and refining the 3D image after the bracket has been removed. The method further includes automatically trimming or basing the 3D image to produce a desired 3D model. The modified 3D image may then be used when designing a customized orthodontic or dental appliance and thus assist the prescribing user update the prescription for the patient.

The current invention provides a method for automatically creating a 3D dental model. The method incudes uploading a first 3D image to an uploads database, detecting image data which corresponds to at least one appliance within the first 3D image, and then deleting the detected image data which corresponds to that at least one appliance from the first 3D image. Next, 3D image data is inferred by calculating an approximate surface of a tooth that is disposed beneath the deleted image data to create a second 3D image. The second 3D image is then saved to a processed database. The method further dictates that the steps of detecting and deleting the image data which corresponds to the at least one appliance from the first 3D image and the step of inferring 3D image data calculated to approximate the surface of a tooth to create a second 3D image are automatically performed in sequence.

In one embodiment, the method also includes refining the inferred 3D image data of the second 3D image which corresponds to the surface of the tooth that is disposed beneath the deleted image data corresponding to the at least one appliance. Specifically, in one related embodiment, refining the inferred 3D image data includes trimming at least a portion of the inferred 3D image data of the second 3D image which corresponds to the surface of the tooth that was disposed beneath the deleted image data corresponding to the at least one appliance. In another related embodiment, refining the inferred 3D image data includes adding to at least a portion of the inferred 3D image data which corresponds to the surface of the tooth that was disposed beneath the deleted image data corresponding to the at least one appliance. In yet another related embodiment, refining the inferred 3D image data includes defining an intersection between the inferred 3D image data which corresponds to the surface of the tooth that was disposed beneath the deleted image data corresponding to the at least one appliance and image data which corresponds to a gumline of the patient within the second 3D image. And in a further embodiment, refining the inferred 3D image data includes smoothening at least a portion of the inferred 3D image data which corresponds to the surface of the tooth that was disposed beneath the deleted image data corresponding to the at least one appliance. Regardless of the how the inferred 3D image data is refined, any artifacts which remain may also be deleted from the inferred 3D image data of the second 3D image.

In another embodiment, saving the second 3D image to the processed database is performed automatically in sequence after inferring the 3D image data which has been calculated to approximate the surface of the tooth disposed beneath the deleted image data.

In a further embodiment, detecting the image data corresponding to the at least one appliance within the first 3D image specifically includes detecting image data corresponding to an orthodontic bracket.

In yet another embodiment, the method also includes transmitting metadata related to the first 3D image to a server that is in communication with the uploads database and the processed database. Here, the first 3D image is then sent from the server to a queue before the image data corresponding to at least one appliance within the first 3D image has been detected.

In another embodiment, uploading the first 3D image to the uploads database specifically includes automatically saving the first 3D image to a file storage within the uploads database.

In a related embodiment, uploading a first 3D image to the uploads database includes uploading a first STL file comprising the first 3D image.

In one embodiment, saving the second 3D image to the processed database further includes saving the second 3D image to a file storage that is within the processed database.

The invention also provides a method for automatically creating a 3D dental model which includes uploading a first 3D image to an uploads database, detecting image data which corresponds to a gumline within the first 3D image, and then trimming the detected image data corresponding to the gumline. Next, the image data corresponding to the gumline is further smoothed to create a second 3D image which is then saved to a processed database. The method further stipulates that the steps of detecting, trimming, and smoothening the image data which corresponds to the gumline within the first 3D image are automatically performed in sequence.

In one embodiment, the method further includes deleting any artifacts from the image data of the second 3D image.

In another embodiment, the method also includes building a base to the image data corresponding to the gumline within the first 3D image.

In one particular embodiment, trimming the detected image data which corresponds to the gumline includes generating a trim line.

In another embodiment, the method includes transmitting metadata which relates to the first 3D image to a server that is in communication with the uploads database and the processed database. The first 3D image is then sent from the server to a queue before image data corresponding to the gumline within the first 3D image is detected.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated system and accompanying method relate to a web based application that receives a standard triangle language (STL) image file which has been obtained from an intraoral digital scan or a cone-beam CT scan of a patient's mouth and teeth, or a digital study model service which can come directly from a lab, a doctor, or another web based application for managing prescriptions within a dental clinic, office, or lab. The method allows for orthodontists to manipulate their prescriptions or change prescriptions for patients who are already wearing braces or other orthodontic appliances which comprise brackets or other similar orthodontic components. The system and method provide an algorithm or series of algorithms to automatically detect the presence of any brackets, bands, attachments, wires, or any other orthodontic or dental appliance and remove its corresponding image data from the 3D image 12. The system and method provide an algorithm or series of algorithms to automatically perform additional functions that assist in the design and manufacture of dental appliances. These additional functions include automatically cleaning the STL file, closing the model, and adding a base in a file format that is print ready or that can be further detailed using CAD software. The image data corresponding to the surface of the teeth beneath the removed appliance is then reconstructed to provide a complete 3D image of the patient's teeth that is free from any appliances.

The current system and method disclosed herein may be a standalone or independent application. For example, the current system and method can be integrated into the platforms disclosed in U.S. Pat. No. 10,299,891, entitled "System and Method for Ordering and Manufacturing Customized Orthodontic Appliances and Product", filed Mar. 16, 2016, and U.S. application Ser. No. 16/712,362, entitled "System and Method for Ordering and Manufacturing Customized Dental Appliances and the Tracking of Orthodontic Products," filed Dec. 12, 2019, both of which are incorporated herein by reference in their entirety.

Figure 1:
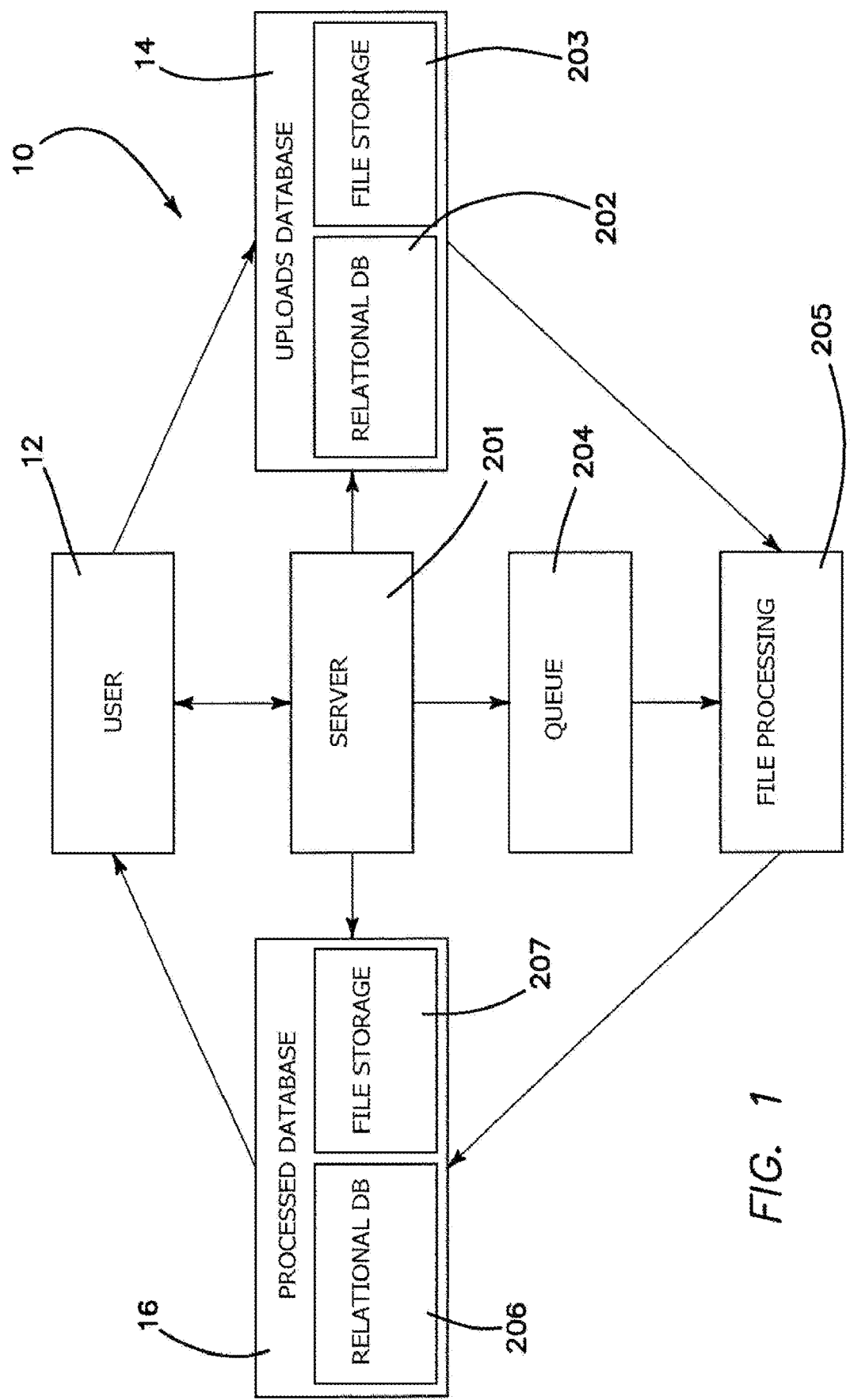
FIG. 1 is a flow chart illustrating a method for automatic creation of a 3D dental or orthodontic model provided by the current invention.
Figure 2:
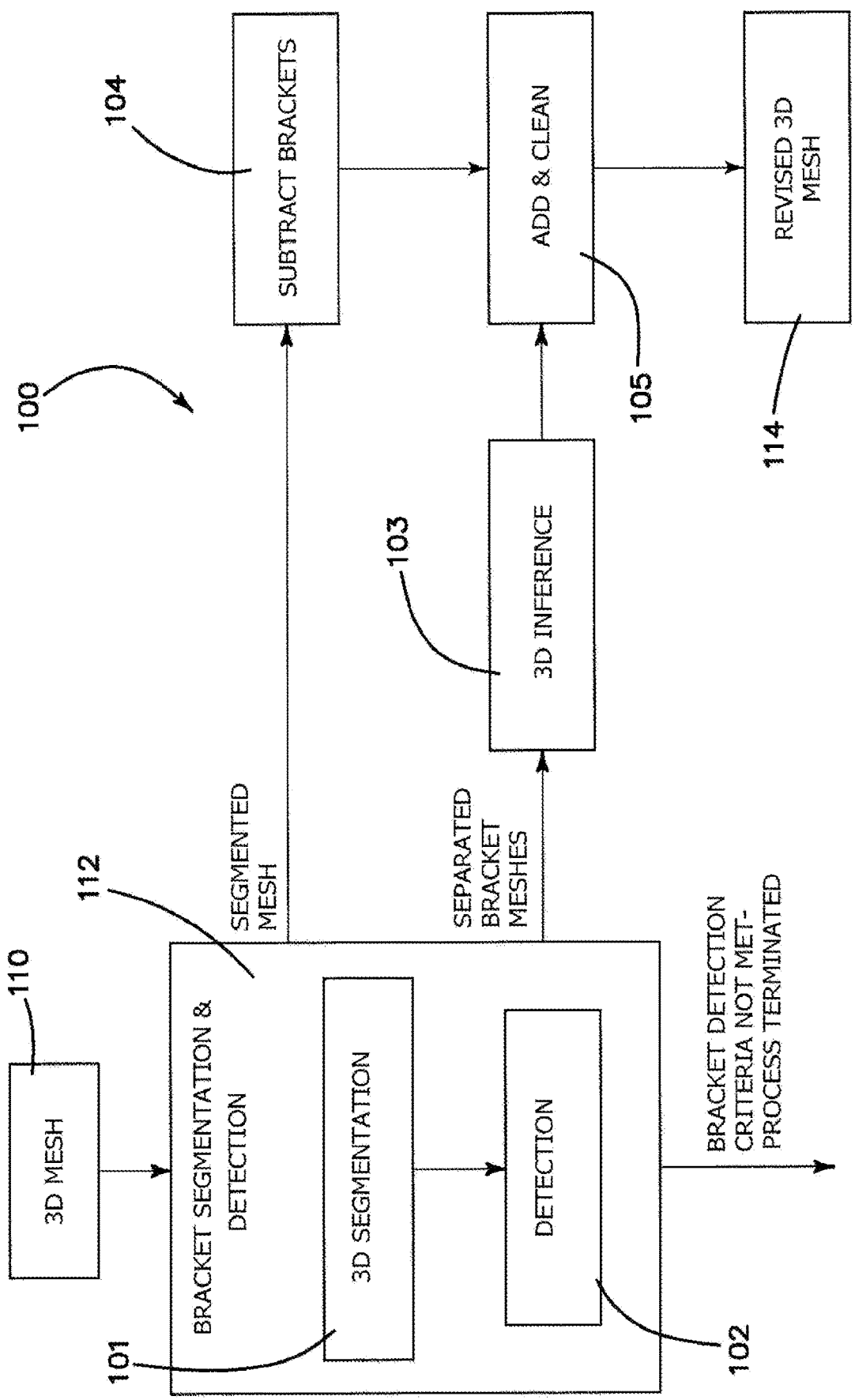
FIG. 2 is a flow chart illustrating a sub-method for automatic removal of orthodontic appliances from a 3D image provided within the method for automatic creation of a 3D dental or orthodontic model seen in FIG. 1.
Figure 3:
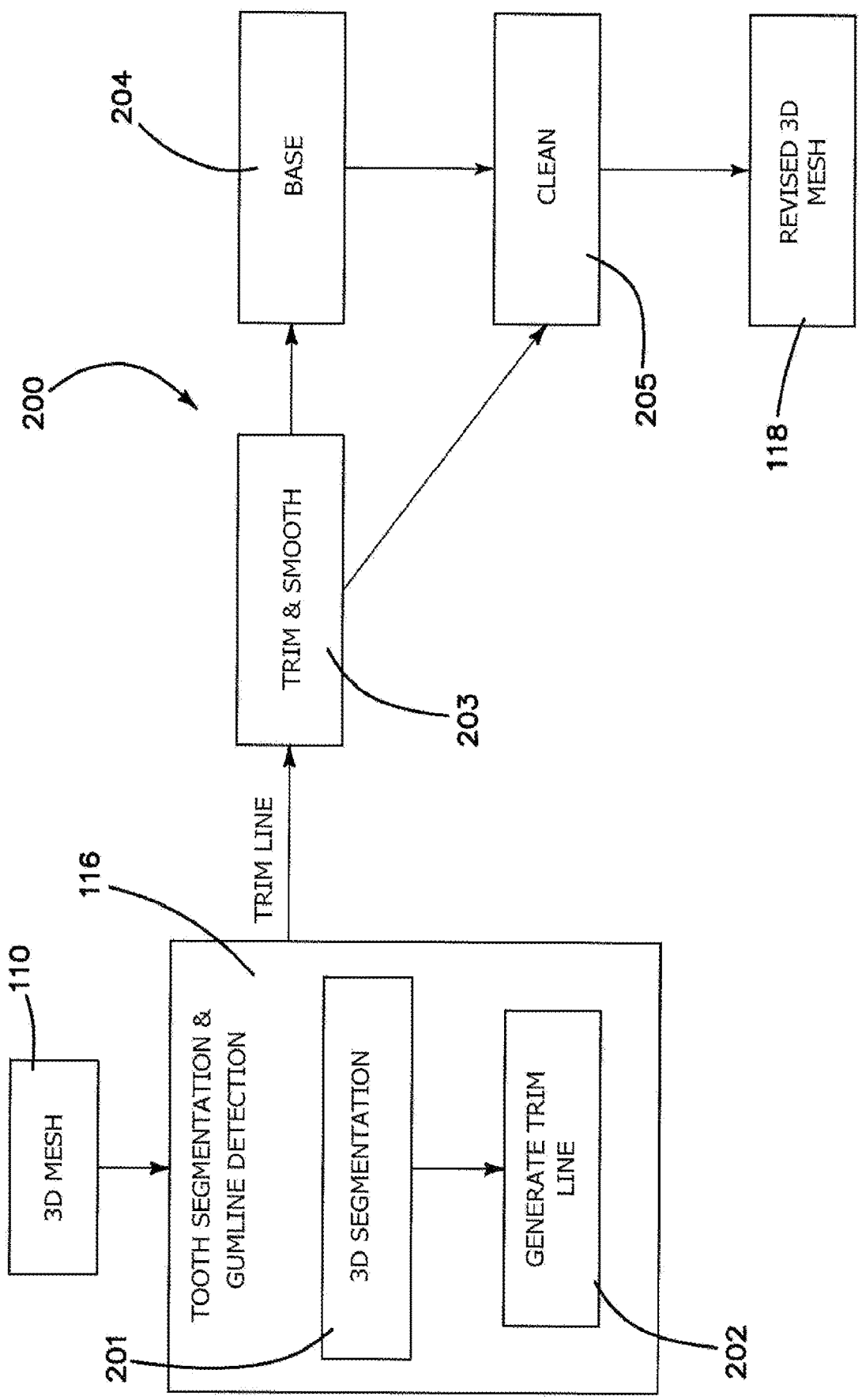
FIG. 3 is a flow chart illustrating a sub-method for automatic trimming and basing of a 3D image provided within the method for automatic creation of a 3D dental or orthodontic model seen in FIG. 1.

The illustrated system and method 10 can be understood by turning to FIGS. 1-3. A user 12, who may be a dentist, an orthodontist, or a lab technician first performs an intraoral scan of the patient's teeth to produce a standard triangle language (STL) file or other 3D image file. The user 12 begins by transmitting metadata to a server 201 including filename and other parameters and receives a response comprising an upload point to an uploads database 14 which is a web based application which comprises a file storage 203 and a relational database 202 for storing and saving the uploaded STL image file. Upon receipt of the incoming STL image file to database 14, the server 201 sends the uploaded STL image file to a queue 204 where it will await for subsequent editing within the file processing step 205 which utilizes a domain-specific language (DSL) or a native computer language to detect any orthodontic or dental appliances which may be contained within the 3D image and then deletes the image data which corresponds to any detected appliances. Next, for those teeth that have had an appliance deleted therefrom, the data processing step 205 includes calculating the curvature of the surface of each tooth and uses the result to approximate the appearance of the surface of the tooth beneath the now deleted appliance. The automatic bracket removal (ABR) process, as defined by the detection of image data which corresponds to an appliance, deletion of the image data which corresponds to the detected appliance, and the reconstruction of the tooth surface disposed beneath the deleted appliance, occurs as soon as the original STL image file is received from the user 12 without any further input on their part. Once the STL file has been automatically edited by the data processing step 205, it is sent to a processed database 16 which is accessible by the user 12. The processed database 16 itself comprises its own corresponding file storage 207 and relational database 206 which are used to store or save the edited STL file. Both the relational database 202 in the uploads database 14 and the relational database 206 in the processed database 16 contain metadata such as processing status and time of upload that can quickly be relayed to the user 12 while the file storage 203 in the uploads database 14 and the file storage 207 in the processed database 16 contain the larger STL image files before and after processing, respectively.

Turn now to the flow chart of FIG. 2 for an overview of the ABR method 100 of the current invention which takes place within the data processing step 205. A STL file which contains one or more 3D meshes 110 is first obtained via an intraoral scan of the patient's mouth and teeth as is known in the art. The 3D mesh 110 includes a rendering of not only the patient's teeth and gum line, but also any brackets or other orthodontic appliances which are currently being used for the patient's orthodontic treatment.

The obtained 3D mesh 110 is first manipulated by a bracket segmentation and detection module 112 as seen in FIG. 2 which automatically prompts a 3D segmentation step 101, followed by a detection step 102, which after a positive detection of image data relating to any brackets or orthodontic appliances is made, divides the original 3D mesh 110 into a segmented mesh and a plurality of separated bracket meshes. Specifically, unique separate bracket meshes are determined by identifying clusters of vertices and labeling them as brackets. Then, the size, shape, and structure of each separate bracket mesh is compared against a set of reference brackets to determine if the detected bracket mesh should be kept or ignored. Conversely, if the bracket segmentation and detection module 112 fails to detect any image data related to any brackets, the threshold criteria has not been met and the ABR method 100 is terminated. The segmented mesh then has the image data corresponding to any detected brackets subtracted or deleted therefrom in step 104. Meanwhile the separated bracket meshes undergo 3D inference in step 103 where 3D image data is calculated to approximate the surface of a tooth disposed beneath the deleted image data to create a complete 3D image of the patient's teeth. Specifically, the 3D inference step 103 uses machine learning techniques trained on a dataset of intraoral scans without brackets to create new image data which corresponds to the surface of a tooth that was previously disposed beneath the now deleted image data related to the bracket. The new image data corresponding to the 3D mesh without the brackets is formed at step 105 where the resulting image from the 3D inference step 103 is added, combined, or integrated with new image data corresponding to the segmented mesh without the brackets from step 104. The end result is a second, updated, or revised 3D mesh 114 which has had the image data related to any brackets or other orthodontic appliances effectively and efficiently removed, thereby providing a clean image of the patient's teeth and providing the user a means to easily adjust or change their prescription accordingly. Also in step 105, any remaining artifacts or miscellaneous image data is deleted from the revised 3D mesh 114, thereby producing a clean image that is free from errors which may interfere with any subsequent manipulation by the user.

In a related embodiment, turn now to the flow chart of FIG. 3 for an overview of the trim and base method 200 of the current invention which takes place within the data processing step 205. An STL image file which contains one or more 3D meshes 110 is first obtained via an intraoral scan of the patient's mouth and teeth as is known in the art. The 3D mesh 110 includes a rendering of not only the patient's teeth and gum line, but also any brackets or other orthodontic appliances which are currently being used for the patient's orthodontic treatment.

The obtained 3D mesh 110 is first manipulated by a tooth segmentation and gumline detection module 116 as seen in FIG. 3 which automatically prompts a 3D segmentation step 201, followed by a generate trim line step 202. Specifically, the trim line in trim line step 202 is generated by selecting all vertices of the segmented teeth as well as vertices within a user-defined distance from the segmented teeth, usually around 2 or 3 millimeters. The trim line is then defined as the vertices at the border of the selection. Any unselected image data is then trimmed or subtracted from the 3D mesh 110 and then further smoothed or rounded in step 204. At this point, depending on the user's ultimate goal, the now trimmed and smoothed 3D mesh may further undergo a base or addition process in base step 204. After base step 204, any remaining artifacts or miscellaneous image data is deleted from the 3D mesh 114 in clean step 205, thereby producing a clean image that is free from errors which may interfere with any subsequent manipulation by the user. Alternatively, instead of performing the base step 204, the trimmed and smoothed 3D mesh may directly be cleaned up or corrected via the clean step 205 as discussed above. Regardless, the end result of the trim and base method 200 is an updated or revised 3D mesh 118 which has had the image data related to any detected gumline effectively and efficiently trimmed, smoothed, and based, thereby providing a clean image of the patient's teeth and providing the user a means to easily adjust or change their prescription accordingly. It is important to note that the trim and base method 200 may be performed independently of the ABR method 100 discussed above, thereby permitting a user to trim and base a 3D mesh 110 without having to first digitally remove any image data relating to any brackets, and vice versa.

Once all automatic image manipulation has been completed, the user can then use the revised 3D mesh 114, 118 to create a new or different prescription for the patient by applying new set of brackets, bands, or attachments. Once applied, the user may send the revised 3D image to a lab where the corresponding attachments may be manufactured and then returned to the user who may then apply them to the patient.

The illustrated embodiments of the system and method can now be understood as an orthodontic or dental appliance removal system and method designed to efficiently and automatically remove orthodontic or dental appliances from an image of an intraoral scan, allowing doctors and other users access to review and update the prescriptions of their patients. The system allows for flexibility to make customizations based on the particular lab using the system. Since this is a web-based system, updates can be made on the fly and the doctors' data is stored via the cloud. In addition, the system and method can further refine the 3D model by cleaning up any remaining image artifacts, as well as adding or trimming elements to and from the 3D models which are subsequently used in the design of appliances.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for automatically creating a 3D dental model comprising:
uploading a first 3D image to an uploads database;
detecting image data corresponding to at least one appliance within the first 3D image, wherein detecting the image data comprises dividing the first 3D image into a segmented mesh and a plurality of bracket meshes;
deleting the detected image data corresponding to the at least one appliance from the first 3D image, wherein deleting the detected image data comprises deleting the detected image data from the segmented mesh;
inferring, using machine learning techniques trained on a dataset of intraoral scans without brackets, 3D image data calculated to approximate the surface of a tooth disposed beneath the deleted image data to create a second 3D image, wherein inferring 3D image data comprises inferring 3D image data from the plurality of bracket meshes; and
saving the second 3D image to a processed database,
wherein the steps of detecting and deleting the image data corresponding to the at least one appliance from the first 3D image and the step of inferring 3D image data calculated to approximate the surface of a tooth to create a second 3D image are automatically performed in sequence.

2. The method of claim 1 further comprising refining the inferred 3D image data of the second 3D image corresponding to the surface of the tooth disposed beneath the deleted image data corresponding to the at least one appliance.

3. The method of claim 2 wherein refining the inferred 3D image data of the second 3D image corresponding to the surface of the tooth disposed beneath the deleted image data corresponding to the at least one appliance comprises trimming at least a portion of the inferred 3D image data of the second 3D image corresponding to the surface of the tooth disposed beneath the deleted image data corresponding to the at least one appliance.

4. The method of claim 2 wherein refining the inferred 3D image data of the second 3D image corresponding to the surface of the tooth disposed beneath the deleted image data corresponding to the at least one appliance comprises adding to at least a portion of the inferred 3D image data corresponding to the surface of the tooth disposed beneath the deleted image data corresponding to the at least one appliance.

5. The method of claim 2 wherein refining the inferred 3D image data of the second 3D image corresponding to the surface of the tooth disposed beneath the deleted image data corresponding to the at least one appliance comprises defining an intersection between the inferred 3D image data corresponding to the surface of the tooth disposed beneath the deleted image data corresponding to the at least one appliance and image data corresponding to a gumline of the patient within the second 3D image.

6. The method of claim 2 wherein refining the inferred 3D image data of the second 3D image corresponding to the surface of the tooth disposed beneath the deleted image data corresponding to the at least one appliance comprises smoothening at least a portion of the inferred 3D image data corresponding to the surface of the tooth disposed beneath the deleted image data corresponding to the at least one appliance.

7. The method of claim 2 wherein refining the inferred 3D image data of the second 3D image corresponding to the surface of the tooth disposed beneath the deleted image data corresponding to the at least one appliance comprises deleting any artifacts from the inferred 3D image data of the second 3D image.

8. The method of claim 1 wherein saving the second 3D image to the processed database is performed automatically in sequence after inferring the 3D image data calculated to approximate the surface of the tooth disposed beneath the deleted image data.

9. The method of claim 1 wherein detecting the image data corresponding to the at least one appliance within the first 3D image comprises detecting image data corresponding to an orthodontic bracket.

10. The method of claim 1 further comprising transmitting metadata related to the first 3D image to a server in communication with the uploads database and the processed database.

11. The method of claim 10 further comprising sending the first 3D image from the server to a queue before detecting image data corresponding to at least one appliance within the first 3D image.

12. The method of claim 1 wherein uploading the first 3D image to the uploads database comprises automatically saving the first 3D image to a file storage within the uploads database.

13. The method of claim 1 wherein uploading a first 3D image to the uploads database comprises uploading a first STL file comprising the first 3D image.

14. The method of claim 1 wherein saving the second 3D image to the processed database comprises saving the second 3D image to a file storage within the processed database.

* * * * *